March 30, 1948.    E. W. LARSEN    2,438,756
VIBRATING APPARATUS
Filed March 27, 1946    7 Sheets-Sheet 1

INVENTOR
E.W. LARSEN
BY E.F.Kane
ATTORNEY

March 30, 1948.    E. W. LARSEN    2,438,756
VIBRATING APPARATUS
Filed March 27, 1946    7 Sheets—Sheet 3

INVENTOR
E. W. LARSEN
BY E. F. Kane
ATTORNEY

March 30, 1948.  E. W. LARSEN  2,438,756
VIBRATING APPARATUS
Filed March 27, 1946  7 Sheets-Sheet 4
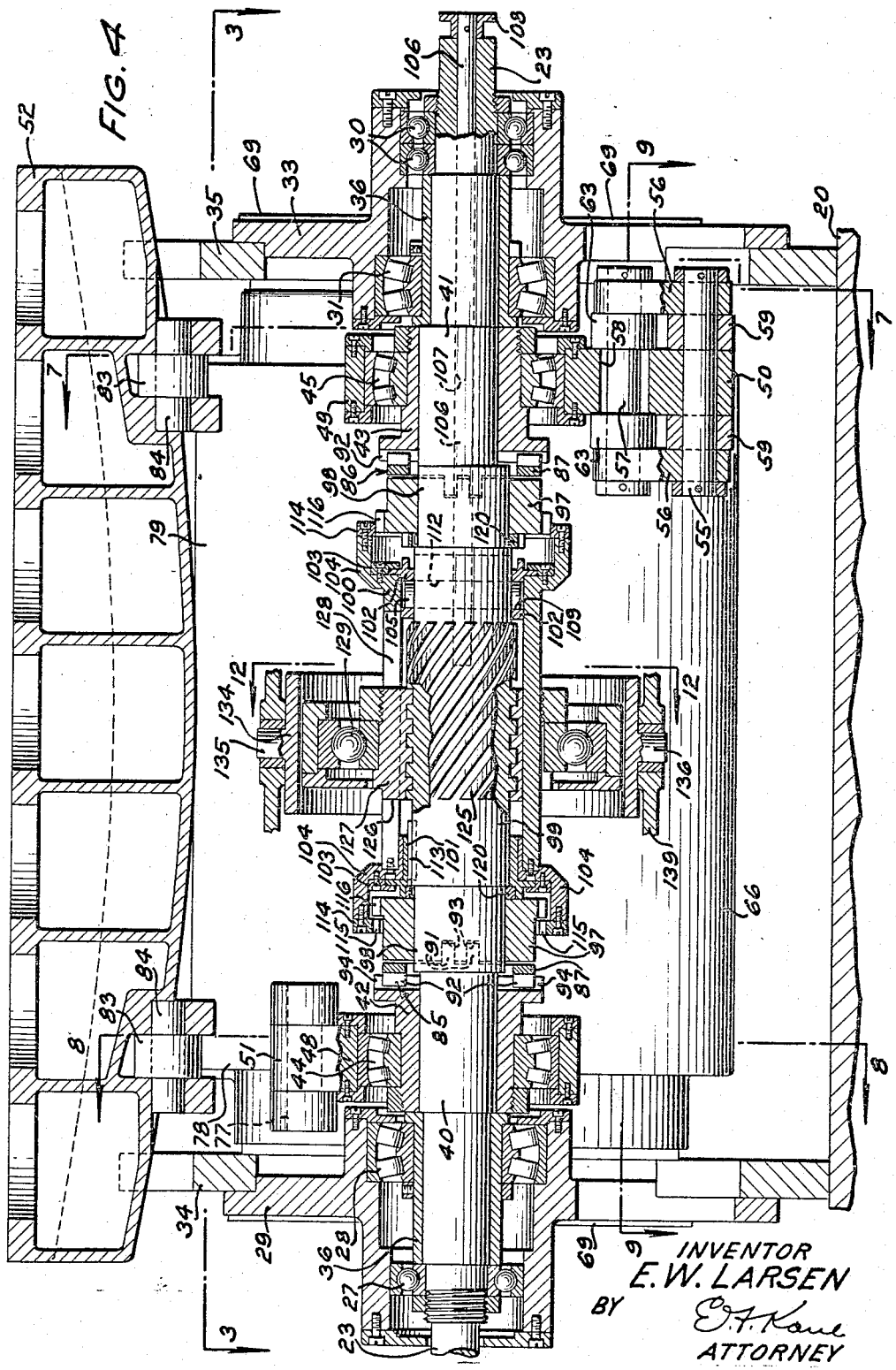
INVENTOR
E. W. LARSEN
BY
ATTORNEY

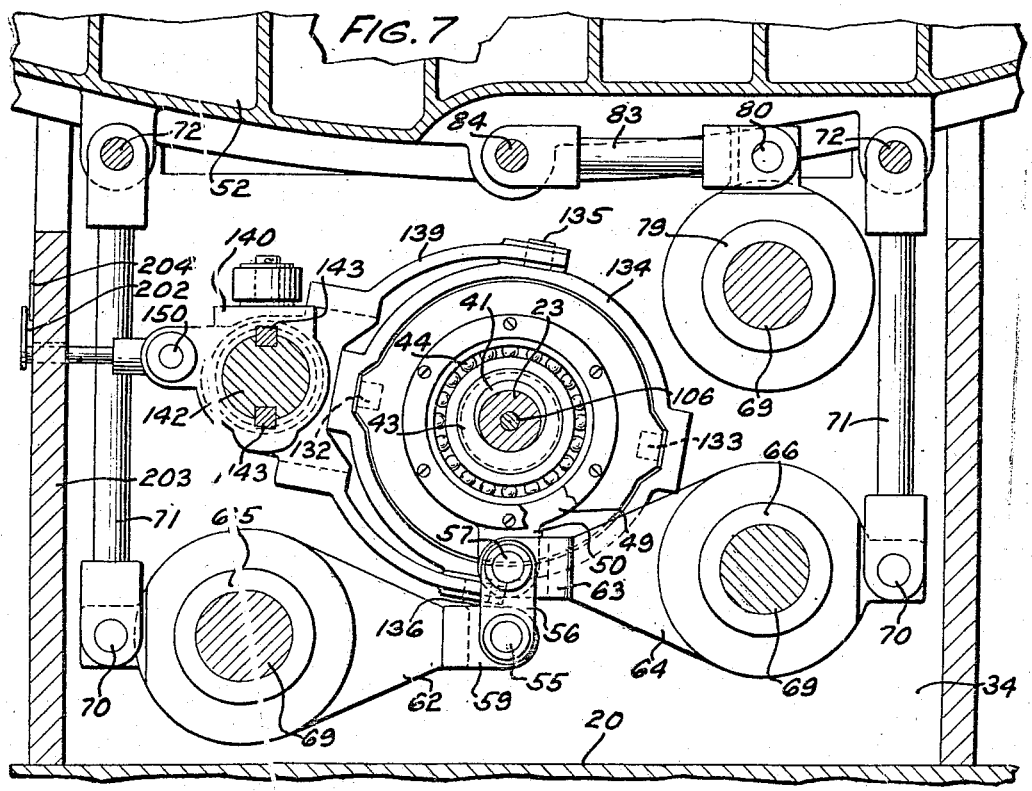
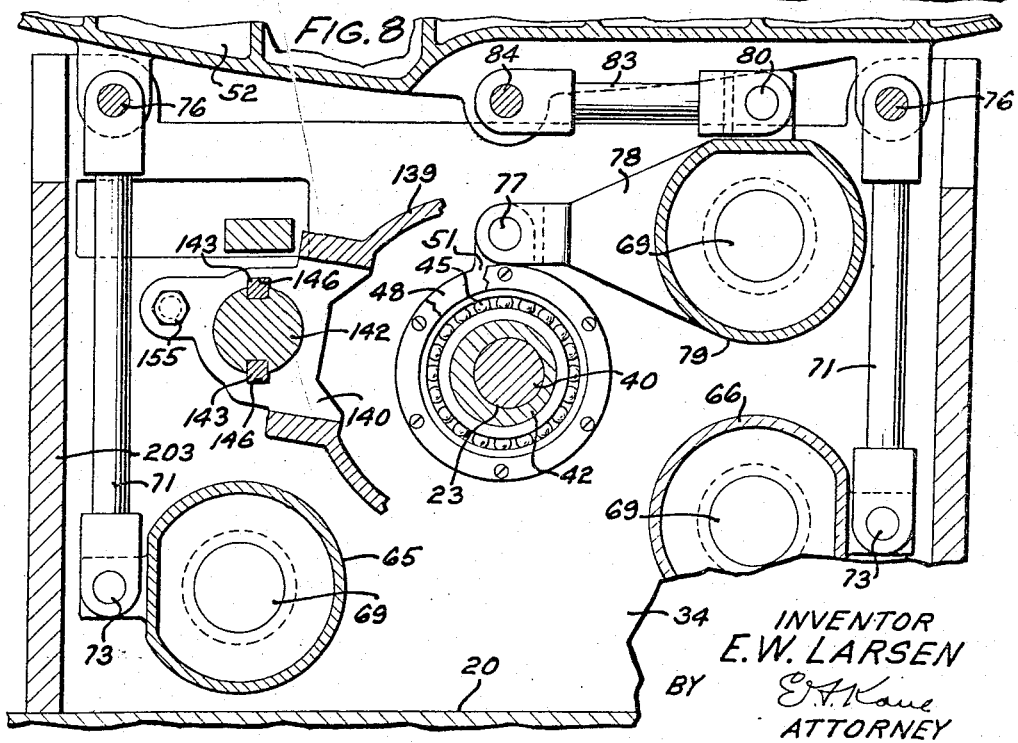

March 30, 1948. E. W. LARSEN 2,438,756
VIBRATING APPARATUS
Filed March 27, 1946 7 Sheets-Sheet 6
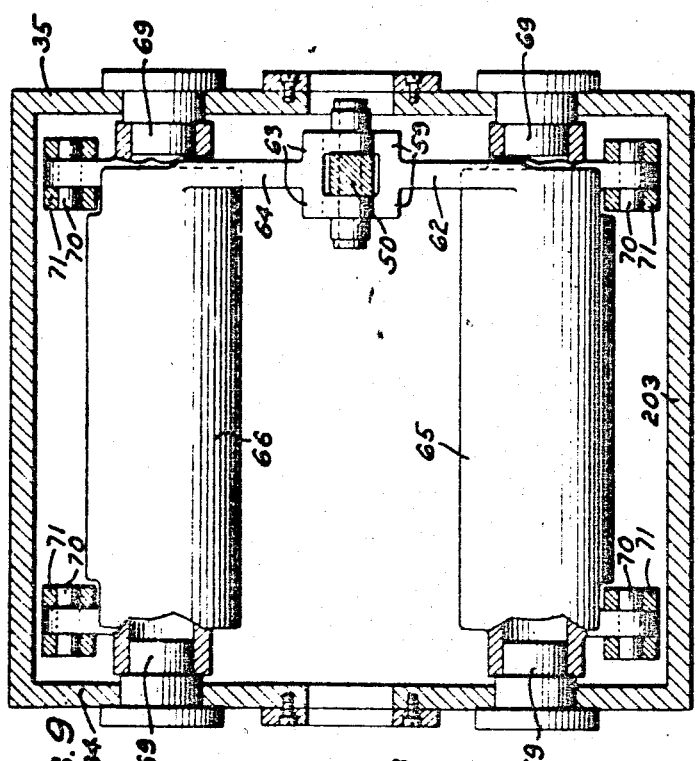
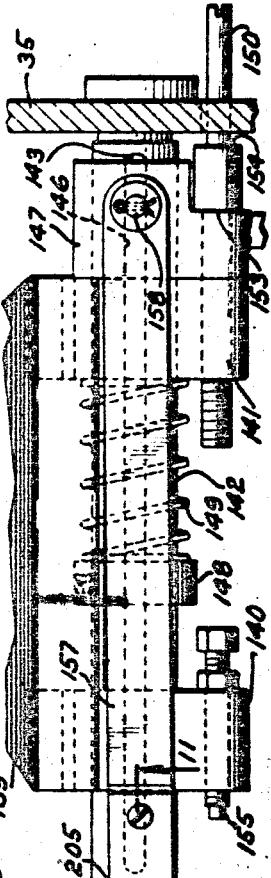
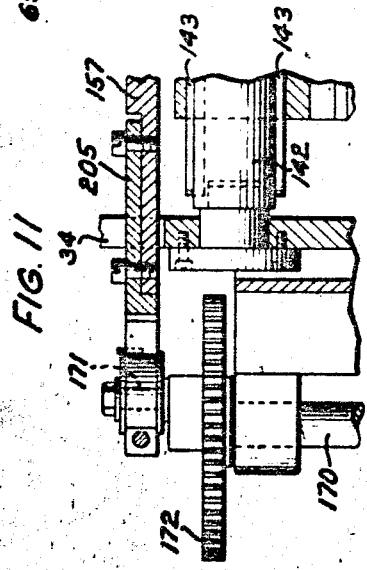
INVENTOR
E.W. LARSEN
BY
ATTORNEY

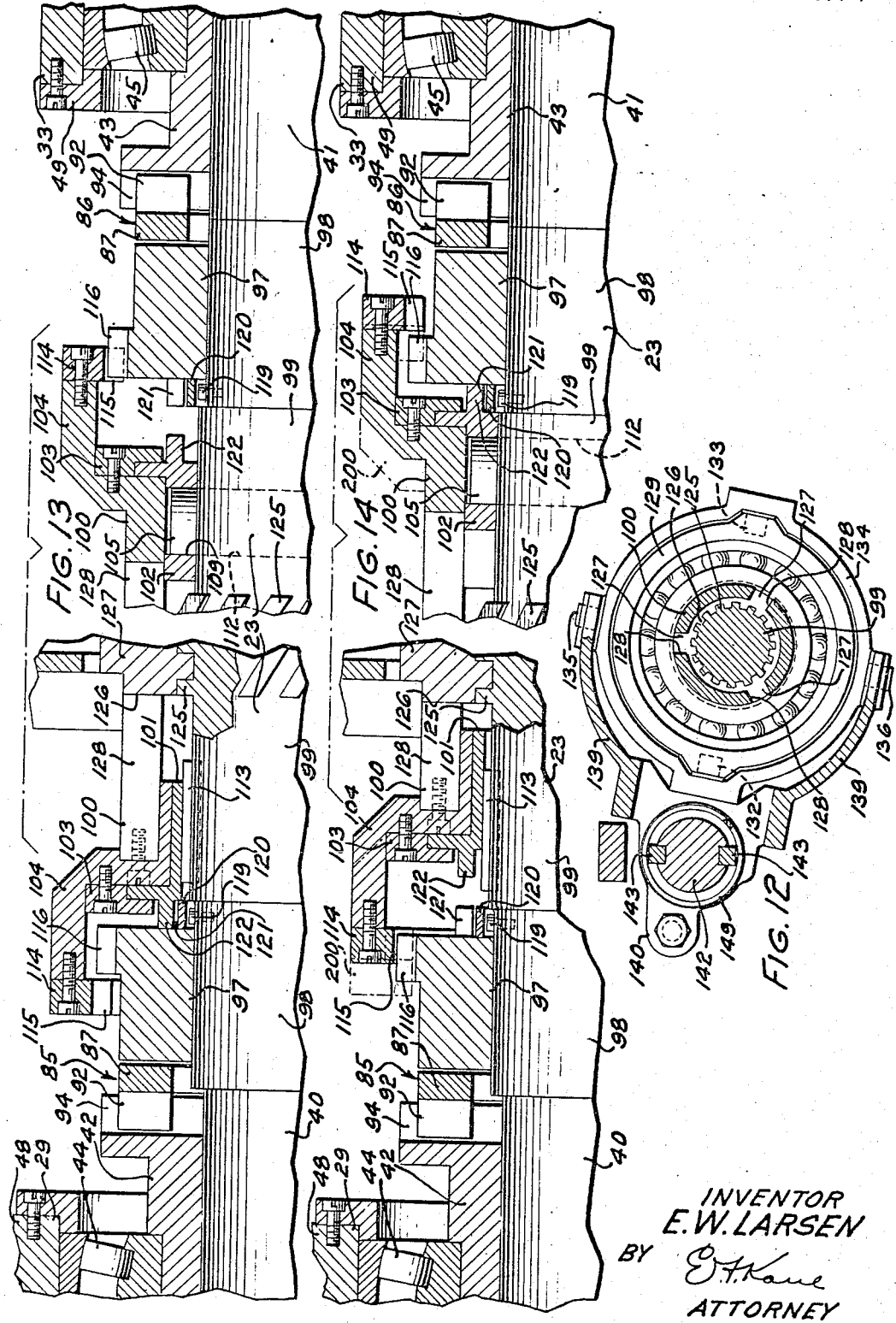
March 30, 1948.  E. W. LARSEN  2,438,756
VIBRATING APPARATUS
Filed March 27, 1946  7 Sheets-Sheet 7
INVENTOR
E. W. LARSEN
BY
ATTORNEY Patented Mar. 30, 1948

2,438,756

UNITED STATES PATENT OFFICE 2,438,756

VIBRATING APPARATUS

Einer W. Larsen, Elmhurst, Ill., assignor to Western Electric Company, Incorporated, New York, N. Y., a corporation of New York Application March 27, 1946, Serial No. 657,355

15 Claims. (Cl. 74—26)

This invention relates to vibrating apparatus and more particularly to a vibrating machine for simulating the vibrations to which apparatus will be subjected when in service.

In the manufacture of electrical apparatus for use in airplanes, ships, et cetera, the apparatus must be constructed to operate under all conditions to which it may be subjected in service and, accordingly, it is necessary to test the apparatus while subjecting it to such vibrations and shocks as it may receive in use. There have been various mechanisms built which attempted to simulate the operating conditions to which such electrical apparatus would be subjected, but as far as is known, none of these mechanisms includes means for compensating for the elasticity of various operating members of the mechanism whereby the amplitude of vibrations of the apparatus may be controlled with a high degree of accuracy while varying the rate of vibration over selected ranges.

An object of the present invention is to provide a simple and practicable apparatus for vibrating articles at predetermined amplitudes and rates in simulation of various conditions to which the articles may be subjected in service.

In accordance with one embodiment of the invention, a reversible constant speed electric control motor drives a pair of cams alternately in opposite directions to shift a main control lever for controlling the amplitude of vibrations of a table supporting articles being vibrated and also drives a potentiometer brush back and forth in a fixed path and through a predetermined distance for controlling the frequency of the vibrations. The movement of the potentiometer brush controls the speed of a main drive motor, which determines the frequency of the vibrations, whereas the main control lever selectively controls the degree of effective eccentricity of either or both of a pair of eccentric assemblies to cause horizontal or vertical or rotary movement to be imparted to the table.

The apparatus may be set up and operated to cause the table to vibrate either horizontally, vertically or through a circular path over a constant amplitude and a selected range of frequency, or at a constant rate of acceleration over a selected range of frequency and to maintain the selected rate of acceleration constant. Mechanism is also provided for compensating for the elasticity of the various members connecting the eccentric bushings to the table whereby the amplitude of vibrations of the table in the first-mentioned set-up may be controlled with a high degree of accuracy while varying the speed of the drive motor of the apparatus. Means is also provided for controlling the control motor's time cycle, thereby to adjust the range of speed.

A complete understanding of the invention may be had by reference to the following detailed description thereof when considered in connection with the accompanying drawings, in which Fig. 1 is a fragmentary plan view of an apparatus embodying the features of the invention, the apparatus being shown set up whereby the table may have imparted thereto either vertical or horizontal or combined vertical and horizontal vibrations of varying frequencies and effective to compensate for the inherent elasticity of the connections between the drive and the table in order to maintain constant the amplitude of vibrations of the table at varying frequencies;

Fig. 4 is an enlarged longitudinal vertical sectional view taken either substantially along the line 4—4 of Fig. 3 or along the line 4—4 of Fig. 1, looking in the direction of the arrows;

Fig. 5 is a fragmentary longitudinal vertical sectional view taken substantially along the line 5—5 of Fig. 3, looking in the direction of the arrows;

Fig. 6 is a fragmentary vertical sectional view taken substantially along the line 6—6 of Fig. 3, looking in the direction of the arrows;

Figure 1:
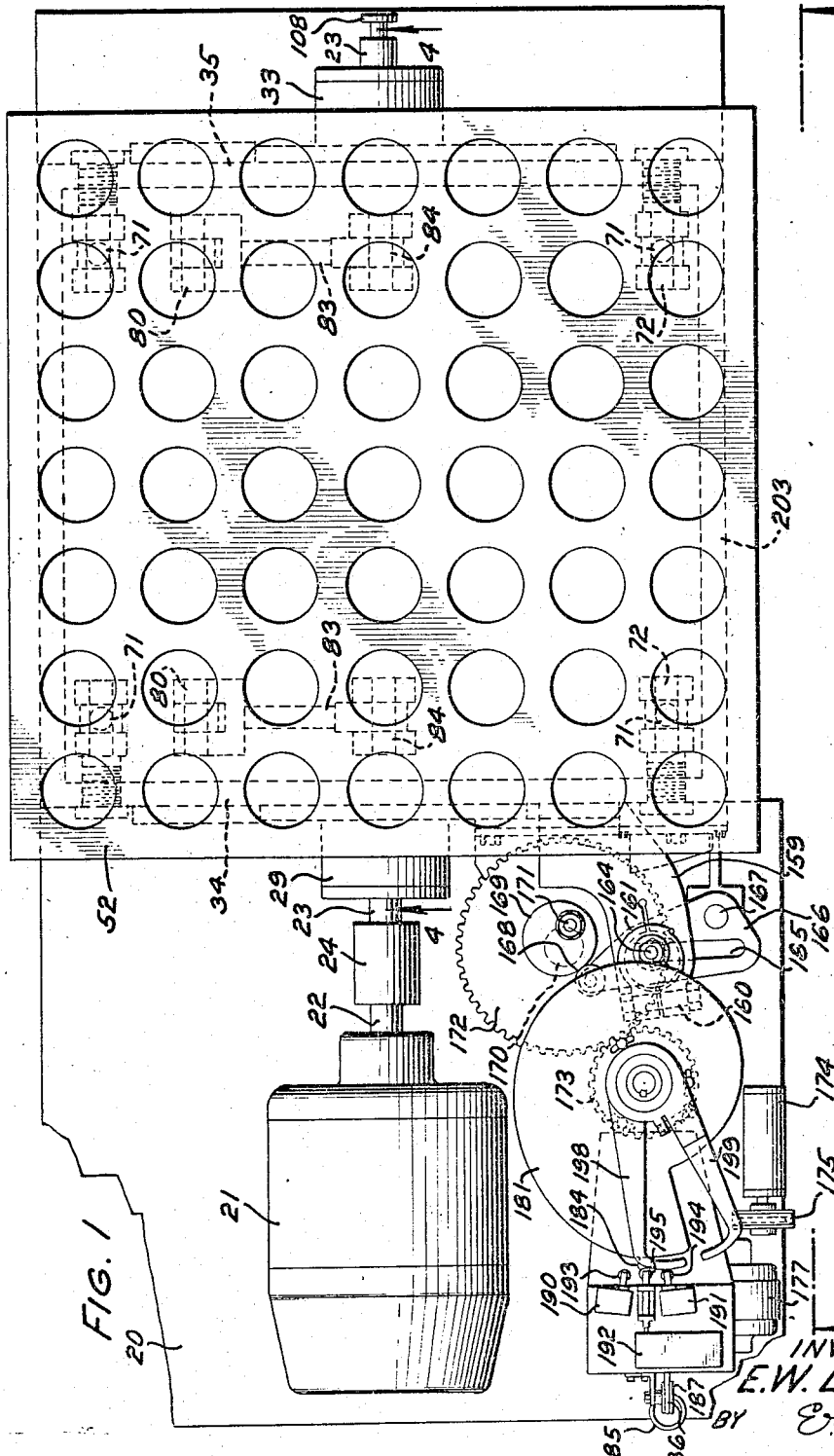
Figure 2:
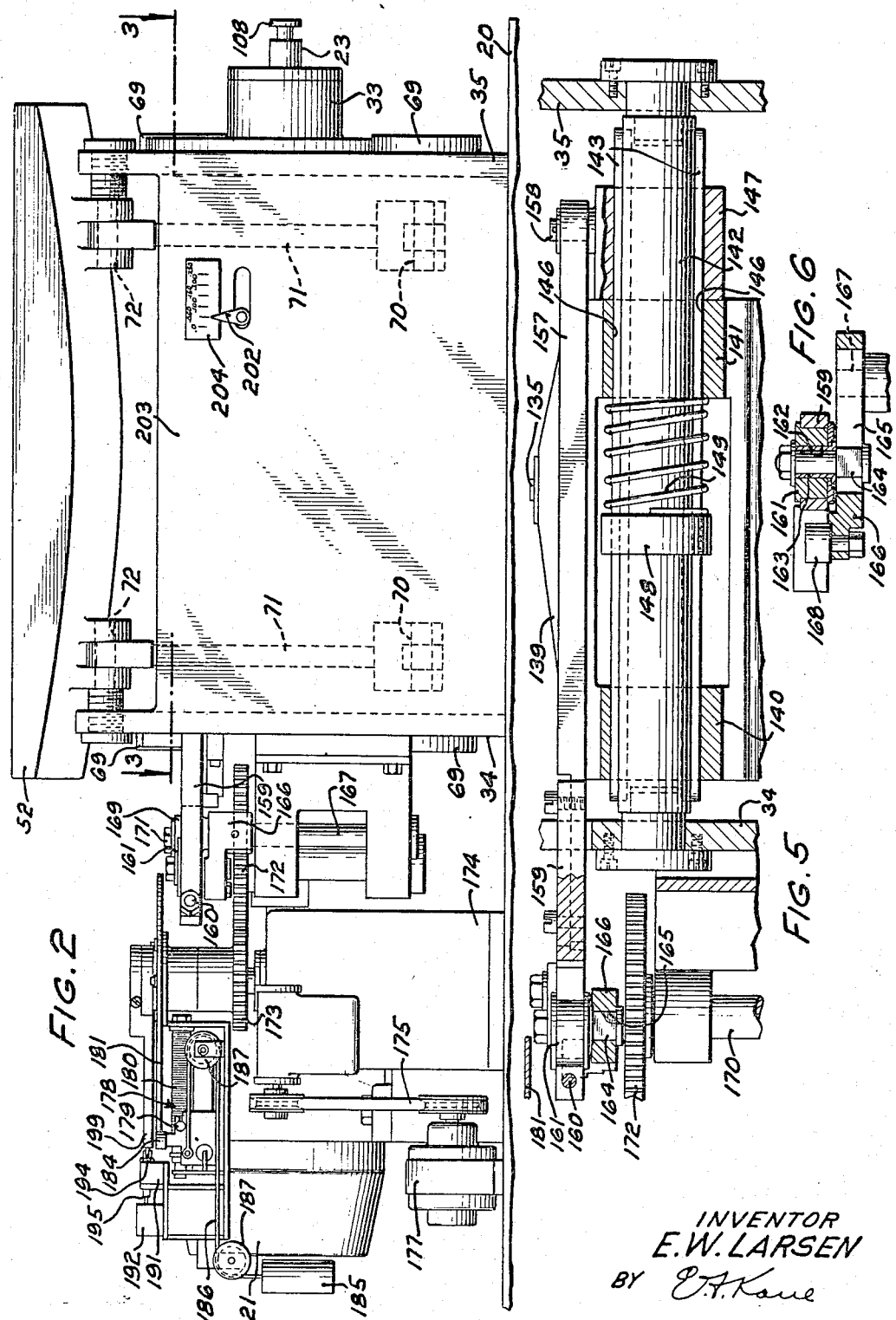
Fig. 2 is a side elevational view of the apparatus shown in Fig. 1, looking at the side of the apparatus as indicated by the line 2—2 of Fig. 1 in the direction of the arrows.
Figure 3:
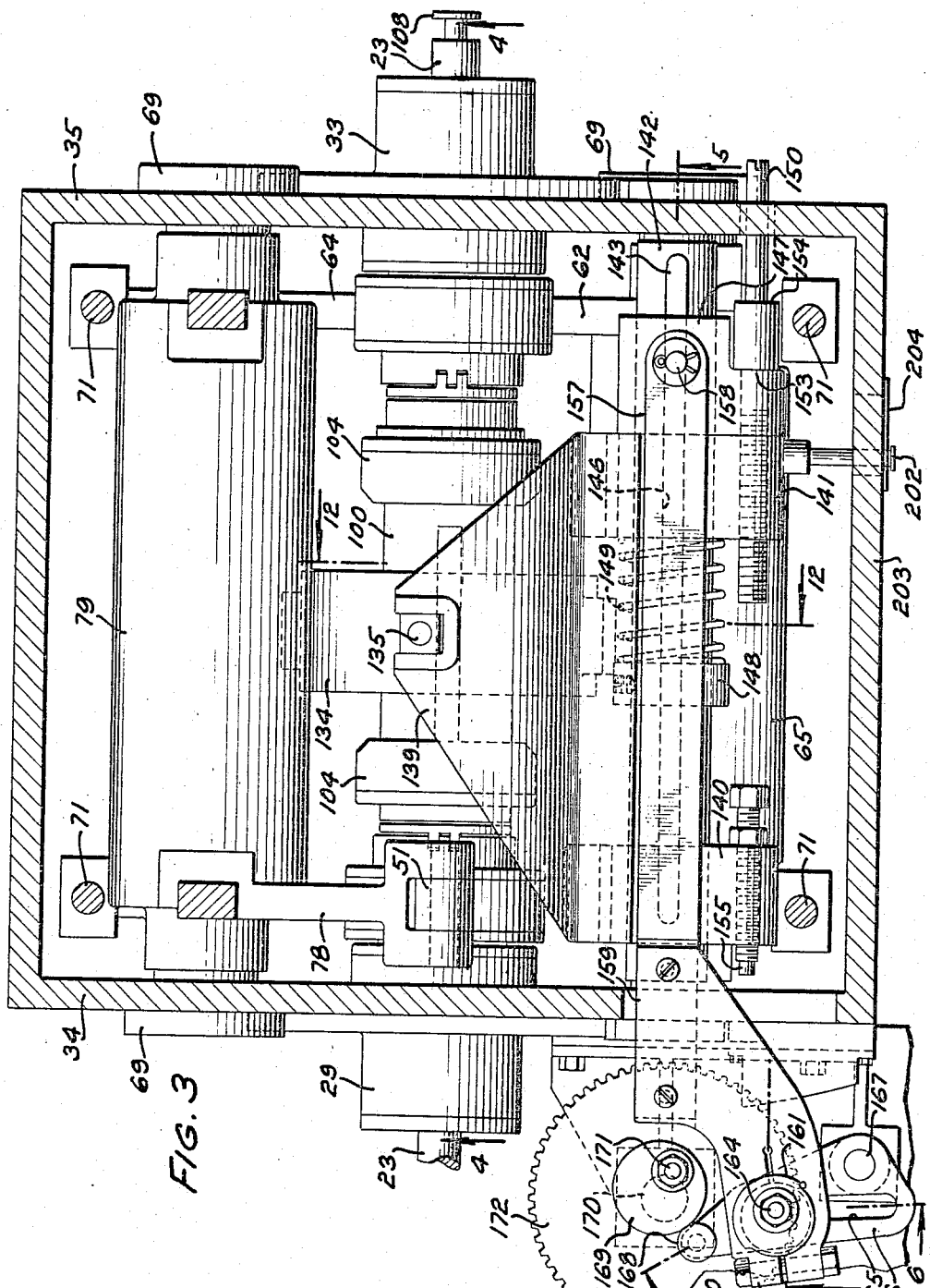
Fig. 3 is a fragmentary plan sectional view taken either substantially along the line 3—3 of Fig. 2 or along the line 3—3 of Fig. 4, looking in the direction of the arrows.

Figs. 7 and 8 are fragmentary vertical sectional views on reduced scales, taken substantially along the lines 7—7 and 8—8 of Fig. 4, looking in the direction of the arrows;

Fig. 9 is a plan sectional view on a reduced scale, partly broken away, taken substantially along the line 9—9 of Fig. 4, looking in the direction of the arrows;

Fig. 10 is a fragmentary plan view of Fig. 3, showing the apparatus set up whereby the table may be vibrated at a constant rate of acceleration over a selected range of speed;

Fig. 11 is a fragmentary vertical sectional view taken along the line 11—11 of Fig. 10, looking in the direction of the arrows;

Fig. 12 is a fragmentary vertical sectional view taken substantially along the line 12—12 of Fig. 3, or along the line 12—12 of Fig. 4, looking in the direction of the arrows; and Figs. 13 and 14 are greatly enlarged fragmentary detail vertical sectional views similar to Fig. 4, Fig. 13 showing the left-hand eccentric portion of the shaft unclutched from its associated bushing, which imparts horizontal vibrations to the table and thus no horizontal vibrations of the table will occur, the right-hand eccentric portion of the shaft being shown clutched to its associated bushing, whereby vertical vibrations of the table will occur; and Fig. 14 showing the left and right-hand eccentric portions of the shaft clutched and unclutched, respectively, to and from their associated bushings whereby horizontal vibrations of the table alone will occur.

Before entering into the detailed description of all of the details of the preferred form of the apparatus, it may be noted that the main control lever, which controls the amplitude of vibrations of the table, is connected to a yoke member spanning a longitudinally fixed shaft driven by the main drive motor and shiftable longitudinally of the shaft. A threaded or helically splined portion on the shaft has a nut thereon which is rotatable relative to the shaft, when moved axially thereon by the yoke member, the nut being splined to a sleeve surrounding and rotatable relative to the shaft and movable axially thereof. Surrounding eccentric portions formed on the shaft adjacent opposite ends of the sleeve are adjustable eccentric bushings, which are operatively connected to the support table, the bushings being so connected with the table that when driven by their associated eccentric shaft portions and dependent upon their eccentricity relative to the axis of the shaft, one will cause a horizontal movement of the table and the other a vertical movement thereof or they may be so coupled together, if desired, to cause the table to move in circular paths of different diameters. Means including "Oldham" type couplings are provided for optionally clutching the sleeve at its opposite ends to either of the bushings or to both of the bushings at the same time to cause the above-mentioned horizontal, vertical and circular movements of the table. The sleeve is shiftable axially of the shaft as desired by means of a hand operable rod movable along the axis of the shaft and connected to the sleeve. The arrangement of coupling the sleeve to only one of the bushings is such that when one bushing is in use to drive the table, the other bushing is set for zero eccentricity with respect to the axis of the shaft and is locked against rotation with respect thereto by the interengagement of a key member keyed to the shaft and carrying teeth in the path of teeth on one of the members of the associated "Oldham" coupling, thus causing the bushing to rotate with the shaft without causing any motion to be transmitted thereby to the table.

Means is provided for automatically shifting the yoke member whereby the nut carried on the shaft will be rotated and shifted axially relative to the shaft and thus the bushing surrounding the eccentric portion of the shaft and coupled to the nut through the sleeve and "Oldham" coupling will also be rotated to cause a variation in the eccentricity of the bushing relative to the axis of the shaft and thus a variation in the movement imparted thereby to the table as the shaft rotates.

In the specific embodiment of the invention chosen for illustration, apparatus is shown in Figs. 1 to 9, inclusive, and Figs. 12, 13 and 14 for vibrating a support table through a cycle of from, for example 60 to nearly 0 vibrations per second at a constant amplitude and including an elasticity compensating mechanism. In providing mechanism for accomplishing this effect, the mechanism includes a main base member 20 (Figs. 1 and 4) having an electric main drive motor 21 mounted upon it, a shaft 22 of the motor being in axial alignment with a main driving shaft 23 of the apparatus and directly connected thereto by a coupling 24. The shaft 23 is journalled at opposite ends, each end having two reduced concentric portions, one end being journalled in ball and roller bearing assemblages 27 and 28, respectively, carried by a bearing block 29 and the other end being journalled in ball and roller bearing assemblages 30 and 31, respectively, carried within a bearing block 33. The bearing blocks 29 and 33 are mounted in side frame members 34 and 35, respectively, suitably attached to the main base member 20, the inner races of the roller bearing assemblages 28 and 31 being fixed to bearing members 36 surrounding the inner reduced portions of the shaft. Adjoining the inner reduced concentric shaft portions are eccentric shaft portions 40 and 41 surrounded by shouldered eccentric bushings 42 and 43. Upon the outer peripheries of the bushings 42 and 43 are rotatably carried roller bearing assemblages 44 and 45, respectively, which are surrounded by bearing rings 48 and 49, respectively. The eccentric shaft portions 40 and 41 and the eccentric bushings 42 and 43 are so proportioned that when the bushings are rotated to a predetermined position with respect to the shaft, the outer surfaces of the bushings will be concentric with the axis of the shaft and, when the bushings are in the predetermined position, rotation of the shaft will not result in movement being imparted to the bearing rings 48 and 49. The eccentric shaft portions 40 and 41 are offset 90 degrees from one another in order to obtain a circular motion of the table when such motion is desired and the eccentric bushings 42 and 43 may be adjusted circularly upon their associated eccentric portions 40 and 41 of the shaft 23 to adjust the effective eccentricity of the bushings with respect to the axis of the shaft or to provide zero eccentricity by means to be hereinafter described.

Extending from the lower side of the ring 49 is an arm 50 and extending from the upper side of the ring 48 is an arm 51 (Figs. 4 and 8). Since the bearing rings 48 and 49 surround the eccentric bushings 42 and 43, respectively, the eccentric motion of the bushings during the rotation of the shaft is transmitted to the rings and, consequently, to the arms 50 and 51. The reciprocatory motions of the arm 50 are transmitted to an article support or table 52 to cause vertical reciprocations by the following interconnected leverage mechanism. Carried by the arm 50 is a pin 55 (Figs. 4 and 7) which extends at opposite ends therefrom and freely rotatably supports links 56—56 on its ends. The links 56—56, in turn, are connected to a pin 57, which extends freely through an aperture 58 in the arm 50. Journalled on the pin 55 are furcations 59—59 of a bifurcated lever 62 and similarly associated with the pin 57 are furcations 63—63 of a bifurcated lever 64. The two levers 62 and 64 extend horizontally in opposite directions and are integral with torque pivot tubes 65 and 66, respectively, pivoted at 69, to the side frame members 34 and 35 (Fig. 9). The tubes 65 and 66 are pivotally connected at 70 to lower ends of rods 71, which are pivotally connected at their upper ends at 72 to two corners of the table 52. The opposite ends of the tubes 65 and 66 are also connected at 73 (Fig. 8) to rods 71 pivotally connected at their upper ends at 76 to two opposite corners of the table.

In the operation of the apparatus, it will be apparent that the vertical reciprocations imparted to the arm 50 during the rotation of the eccentric portion 41 of the shaft 23 will be transmitted through the levers 62 and 64, the torque tubes 65 and 66, and the vertical rods 71 simultaneously to the four corners of the table. It will also be apparent that the frequency of such vertical reciprocations of the table may be controlled by varying the revolutions per minute to the main driving shaft 23.

For imparting horizontal reciprocations to the table 52 from the vertical reciprocations imparted to the arm 51 during the rotation of the eccentric portion 40 of the shaft 23, the following interconnected leverage mechanism is provided. The arm 51, which extends vertically from the upper side of the ring 48 (Figs. 4 and 8), is pivoted at 77 to a horizontally disposed lever 78 integral with a torque pivot tube 79 pivoted, directly above the tube 66 in a manner similar to that of the tubes 65 and 66, to the side frame members 34 and 35. Pivotally connected at 80 to opposite ends of the tube 79 are ends of horizontally extending rods 83, which are pivotally connected at their opposite ends at 84 to the table 52. It will be apparent, during the operation of the apparatus, that the vertical reciprocations imparted to the arm 51 during the rotation of the eccentric portion 40 of the shaft 23 will be transmitted through the lever 78, torque tube 79 and the horizontal rods 83 simultaneously to spaced points of the table 52, which points are arranged intermediate the vertical rods 71 and that the frequency of such horizontal reciprocations of the table may be controlled by varying the revolutions per minute of the main driving shaft 23.

It is to be noted that the table 52 never reciprocates in a truly horizontal or vertical plane due to the fact that it is always connected to both of the described leverage mechanisms; that is, when the table is being operated horizontally by the horizontal rods 83, it will be supported for horizontal movements by the vertical rods 71 and thus will move in a slightly arcuate path. Similarly, when the table is being operated vertically, the horizontal rods 83 will guide it in its vertical movements and it, therefore, will move in a slightly arcuate path.

In order to impart either horizontal or vertical movements to the table 52, the adjustable eccentric bushings 42 and 43 may be adjusted upon their corresponding eccentric shaft portions 40 and 41, whereby, dependent upon their eccentricity relative to the axis of the shaft, either horizontal or vertical movements will be imparted to the table and the degree of eccentricity will control the amplitude of movement of the table. The arrangement is such that when it is desired to impart either horizontal or vertical movements to the table 52, one bushing is set for zero eccentricity with respect to the axis of the shaft 23 and is locked against rotation with respect thereto.

To accomplish this optional adjustment of the eccentric bushings 42 and 43, the following mechanism is provided. Associated with each of the bushings 42 and 43 are "Oldham" type couplings 85 and 86, respectively. The "Oldham" couplings are of exactly the same construction and, therefore, only one of them, coupling 85, associated with the eccentric bushing 42, will be described in detail herein. This coupling 85 comprises an annular radially floating member 87 having a plurality of teeth or keys 91 and 92 (Figs. 4, 13 and 14) extending at right angles one to another from opposite annular end faces thereof and projecting into radial keyways 93 and 94 formed in the opposed end faces of an "Oldham" clutch bushing 97 and the eccentric bushing 42, which also serves as a part of the "Oldham" coupling, whereby the coupling 85 will serve to interconnect the bushing 42 and the bushing 97 for rotation together, but will permit the bushing 42 to be moved eccentrically of the axis of the shaft 23 in a manner to be presently described. The annular toothed members 87 and the clutch bushings 97 of the couplings 85 and 86 surround concentric portions 98 of the shaft 23, the latter shaft portions being contiguous at opposite ends with the eccentric shaft portions 41 and 42 and a central concentric portion 99 of greatest diameter of the shaft.

Surrounding the central shaft portion 99 is a rotatable and longitudinally movable clutch sleeve 100, which is rotatably supported upon flanged sleeves 101 and 102, which are connected to the sleeve 100 for longitudinal movement therewith. Rings 103—103 attached to enlarged ends 104—104 of the sleeve 100 secure the sleeves 101 and 102 to the sleeve 100 for longitudinal movement therewith. This longitudinal movement of the sleeve 100 is effected by means of a key 105 (Figs. 4, 13 and 14) fixed to a manually slidable rod 106 (Fig. 4) mounted in an axial aperture 107 in the shaft 23, the rod having an operating handle 108 at its outer end. The key 105 extends laterally from the rod 106 into opposite apertures 109 in the sleeve 102 and is reciprocable in a slot 112 in the shaft 23 and thus the sleeve 102, although movable longitudinally with the sleeve 100, which latter sleeve is rotatable relative to the shaft 23, is prevented from rotating relatively to the shaft 23. Similarly the sleeve 101 is prevented from rotating with the sleeve 100 although movable longitudinally therewith by being keyed as indicated at 113 to the shaft 23 (Figs. 13 and 14).

Upon its outer ends, the clutch sleeve 100 has fixed thereto toothed rings 114, each having a plurality of inwardly extending teeth 115, which are adapted to mesh with a plurality of teeth 116 on the periphery of the "Oldham" clutch bushings 97 upon longitudinal movement of the sleeve 100 in one direction or the other, the teeth 115 and 116 being so spaced that they mesh only when the sleeve and bushings are predeterminedly angularly related, in which angular relation the eccentric bushings 42 and 43 are arranged relative to the eccentric shaft portions 40 and 41, respectively, for zero eccentricity with respect to the axis of the shaft and thus the bushings will rotate with the shaft without imparting any movement to the table 52. Keyed, as indicated at 119, to the concentric shaft portion 98 outside of and aligned with the ends of the "Oldham" clutch bushings 97 are annular spacer or stop rings 120, which abut at one end annular shoulders on the adjacent ends of the central concentric portion 99 of the shaft 23. The clutch bushings 97 each have formed on their inner end faces a plurality of teeth 121, which are adapted to mesh with a plurality of teeth 122 on the adjacent end faces of the flanged sleeves 101 and 102 when the sleeve 100 is moved longitudinally to the limit of its movement in either direction, in which positions the sleeves abut the stop rings 120, the movement of the sleeve 100 being effected by a shifting of the manually operated rod 106. The relation of the teeth 121 and 122 at the termination of these movements of the sleeve 100 is clearly shown in Figs. 13 and 14.

In Figs. 4 and 13, the clutch sleeve 100 has been shifted to its extreme lefthand position and, consequently, the teeth 122 of the sleeve 101 are meshed with the teeth 121 on the clutch bushing 97 of the "Oldham" clutch 85 and the teeth 115 movable with the clutch sleeve 100 have been moved out of mesh with the peripheral teeth 116 on the bushing 97 of the coupling 85. The alignment of the teeth 121 and 122 for meshing is insured since the previously intermeshed teeth 115 and 116 are disengaged as the teeth 121 and 122 are engaged. With the sleeve 100 in this position, it will also be observed that the teeth 122 of the right hand sleeve 102 are out of mesh with the teeth 121 on the clutch bushing 97 of the "Oldham" clutch 86 and the right hand teeth 115 movable with the clutch sleeve 100 are in mesh with the peripheral teeth 116 on the right hand bushing 97. When the clutch sleeve 100 is thus positioned (Figs. 4 and 13), the left hand eccentric bushing 42 will be locked against rotation with respect to the shaft 23 by the interengagement of the teeth 121 and 122 and in this position the eccentric bushing 42 will be arranged relative to the eccentric shaft portion 40 for zero eccentricity with respect to the axis of the shaft and thus the bushing 42, in the operation of the apparatus, will rotate with the shaft without imparting any horizontal movement to the table 52. Also, in this left hand position of the clutch sleeve 100 (Figs. 4 and 13), the right hand eccentric bushing 43, due to the teeth 122 of the right hand sleeve 102 being out of mesh with the teeth 121 on the clutch bushing 97 of the "Oldham" clutch 86, is free to be adjusted about the eccentric shaft portion 41 to vary the effective eccentricity of the bushing with respect to the axis of the shaft 23 by rotating the bushing with respect to the shaft for imparting vertical movement to the table 52.

Fig. 14 illustrates the relation and position of the parts illustrated in Figs. 4 and 13 when the clutch sleeve 100 has been shifted to its extreme right hand position, thus permitting the left hand eccentric bushing 42 of the "Oldham" clutch 85 to be adjusted about the eccentric shaft portion 40 to vary the effective eccentricity of the bushing 42 with respect to the axis of the shaft 23 by rotating the bushing with respect to the shaft and thereby imparting horizontal movement to the table 52 when the shaft rotates.

For the purpose of adjusting the eccentric bushings 42 and 43 during operation of the apparatus, when the bushings are free to be adjusted, as above described, the following mechanism is provided. Formed on the central shaft portion 99 are right hand spiral threads 125 of suitable lead and length, on which is a nut 126 having three equally spaced splines or keys 127 extending radially from its periphery (Figs. 4 and 12). The keys 127 are slidable in three similarly spaced keyways 128 formed longitudinally in the clutch sleeve 100 and thus, when the nut 126 is shifted axially to the right upon the spiral threads 125 from the position shown in Fig. 4, with the teeth 114 and 116 in mesh, with respect to the shaft 23, relative rotation will be imparted to the sleeve 100 and, through the "Oldham" clutch 86, the eccentric bushing 43 will be rotated or adjusted with respect to the eccentric shaft portion 41.

A ball bearing assemblage 129 has its inner race attached to the nut 126 and its outer race pivotally connected by means of trunnions 132 and 133 to a ring 134, which, in turn, is pivotally connected by means of trunnions 135 and 136 to a yoke 139, thus providing a universal coupling between the ball bearing assemblage and the yoke. The yoke 139 is provided with spaced irregularly shaped bearing blocks 140 and 141 (Figs. 3 and 5), which are keyed for movement longitudinally of a fixed shaft 142 secured at opposite ends to the side frame members 34 and 35, the shaft carrying two diametrically opposed keys 143, which are entered in similarly arranged keyways 146 in the bearing blocks. Similarly keyed on the shaft 142 to the right of the bearing block 141 is an irregularly shaped slide block 147, which, in the operation of the apparatus, is reciprocated upon the shaft 142. Fixed to the shaft 142 intermediate the bearing blocks 140 and 141 is a collar 148 and surrounding the shaft between opposed faces of the collar and the bearing block 141 is a compression spring 149, which normally urges the yoke 139 to the right (Figs. 3 and 5).

Before it is possible to actuate the shift rod 106 to change direction of vibration of the table 52, it is necessary to bring the bushings 42 and 43 to a zero position of eccentricity. To accomplish this, there is provided a shouldered pin 150 (Fig. 3) having a threaded portion threaded in the bearing block 141 of the yoke 139 and having a shouldered face 153 normally abutting the adjacent face of the slide block 147. At its outer end, the pin extends freely through an aperture in the side frame member 35 for engagement by a crank arm (not shown). Thus, to set the bushings 42 and 43 to zero eccentricity, the pin 150 may be rotated in a direction to advance an outer shouldered face 154 thereof into abutting relation with the inner face of the side frame member 35, after which a continued rotation of the pin will cause movement of the yoke bearing block 141 towards the left, as viewed in Fig. 3. This last described movement of the yoke bearing block 141 and the parts movable therewith, which includes the nut 126, will continue until a stop screw 155 carried by the yoke bearing block 140 engages the inner face of the side frame member 34. At this point, due to the axial movement of the nut 126 along the shaft 23, the eccentric bushings 42 and 43 will have been brought to zero position and, as thus positioned, the rod 106 may be actuated to change the direction of vibration of the apparatus. When this has been effected, the pin 150 is returned to its normal position by rotating it in the opposite direction, with the shouldered face 153 abutting the adjacent face of the slide block 147, thus locking the slide block to the yoke 139 so that they will reciprocate in unison at all times in the operation of the apparatus. It will be understood that the stop screw 155 is predeterminedly adjusted and set in the initial set-up of the apparatus.

From the foregoing, it is believed to be apparent that the table 52 may be reciprocated optionally in a vertical or horizontal direction, dependent upon the position of the manually operable rod 106, the position of which determines which of the eccentric bushings 42 and 43 is set for driving the table 52. Also, by varying the effective eccentricity of the eccentric bushings 42 and 43 with respect to the axis of the rotating shaft 23, the table 52 will be vibrated through predetermined distances by the driving of one of the bushings, while the other bushing is set for zero eccentricity. The varying of the eccentricity of either of the bushings 42 and 43, it will be noted, is effected by a movement of the yoke 139 longitudinally of the shaft 23. This movement of the yoke 139 will result in a movement of the nut 126 on the spiral threads 125 of the shaft. Thus, by means of the sleeve 100 connected to the nut 126 and the coupling between the sleeve and the particular eccentric bushing set for driving the table 52, a relative rotation will be obtained between the nut and the shaft 23 and thereby a turning of the eccentric bushing on the eccentric portion of the shaft.

The above-described apparatus is capable of being operated to cause, as hereinbefore referred to, either vertical or horizontal vibrations of selected amplitudes of the table 52 in either of two ways, that is, to operate at a constant or fixed amplitude and a varying rate of frequency, or to operate at a constant acceleration over a selected range of frequency. Also, in the first of these two ways of operation, mechanism is provided for compensating for the inherent elasticity of the various members connecting the shaft 23 to the table 52, whereby the constancy of amplitude of vibrations of the table may be controlled with a high degree of accuracy while varying the rate of vibration by changing the speed of the main drive motor 21 for the apparatus.

Reciprocation of the yoke 139, which, as before described, controls the amplitudes of vibrations of the table 52, is effected by a main control lever 157 (Figs. 3 and 5) pinned at 158 to the slide block 147, which, in the manner previously described, is locked to the yoke 139. Fixed to the lever 157 is an irregularly shaped extension lever 159. With this combination of levers 157 and 159, and the associated mechanism to be presently described, the apparatus is set up to vibrate the table 52 at a fixed amplitude and at a varying rate of vibration and to compensate for the elasticity of the various operative connections between the shaft 23 and the table 52.

At its outer end, the extension lever 159 is split to receive and clamp, as indicated at 160, an adjustable bearing bushing 161 in any selected position of rotation. The bushing 161 has a flange at its upper end (Fig. 6) and formed eccentrically in and extending through the bushing is a circular aperture 162 for freely receiving a cylindrical portion of a sleeve 163 having a flange at its lower end. Between the flange of the sleeve 163 and the lower surfaces of the bushing 161 is a washer having an eccentrically formed aperture which also engages the lower surface of lever 159 and which is maintained in alignment with the eccentric aperture 162 in the bushing by securing the washer and bushing together in a suitable manner after assemblage so that they may be rotated as a unit to a selected position. Fitted in the aperture of the sleeve 163 and the aperture in the lower washer is a cylindrical portion of a headed pin 164, which is provided with two substantially flat surfaces adapted to engage surfaces of an arcuately formed slot 165 formed in a lever 166 pivoted on a rod 167 carried on the frame of the apparatus. At its upper end, the pin 164 is screw-threaded to receive a nut, by means of which, together with a washer bearing on the upper annular end surface of the sleeve 163 and a lower head on the pin, the sleeve, the pin, and the lever 166 may be clamped together as a unit with the bushing 161 free to rotate upon the periphery of the sleeve in the operation of the apparatus. It will be apparent that by loosening the clamp screw 160, the bearing bushing 161 may be rotated on the extension lever 159 to a selected position and, due to its eccentric bearing on the sleeve 163, the extension lever 159 and the attached lever 157 and the parts movable therewith, including the nut 126, will be shifted longitudinally.

The free end of the lever 166, previously mentioned, carries a cam roller 168, which rides on the peripheral surface of a rotatable cam 169 under the urging of the compression spring 149. The cam 169 is carried upon a shaft 170 having an eccentric portion 171, the purpose of which will be described hereinafter. The shaft 170 is driven through a train of gears 172 and 173 (Figs. 1 and 2) from a gear reducer 174 driven by belt and pulleys, indicated at 175, in turn driven by a reversible constant speed electric control motor 177. Thus, upon rotation of the cam 169, the lever 166 will be oscillated about the rod 167 and motion will be transmitted through the levers 159 and 157 to the yoke 139 to shift the nut 126 axially along the spiral thread 125 of the shaft 23. When the nut 126 is shifted axially of the thread 125, relative rotation will be effected between the shaft 23 and either or both of bushings 42 and 43, depending upon the position of the rod 106. In this manner, when the nut 126 is moved axially of the shaft 23, a gradual variation of the effective eccentricity of the driving portions of the shaft is effected and, consequently, the amplitude of the vibrations of the table 52 will be gradually varied in a selected range determined by the area and amplitude of movement of the nut 126. The amount of reciprocation imparted to the combined levers 159 and 157 will depend upon the position of the pin 164 along the slot 165 of the lever 166 and the particular contour of the cam 169, the pin being predeterminedly adjusted and clamped in position.

It will be understood that with an accurate adjustment of the bushing 161 in the lever extension 159 and an accurate setting of the pin 164 along the slot 165 of the lever 166, in combination with a predetermined contour of the cam 169, the required change in the effective eccentricity of either of the bushings 42 and 43 may be had to compensate for the change in overthrow of the table 52 during its movements due to the elasticity of the various members connecting the shaft 23 to the table 52 as the rate of vibration changes.

The speed of the main drive motor 21, which determines the frequency of vibrations of the table 52, is controlled by a potentiometer, indicated in general at 178 (Fig. 2), having a brush 179 movable back and forth across a fixed surface or winding 180 of the potentiometer. A potentiometer controlling cam 181 is secured to the low speed shaft of the speed reducer 174 and is thus driven from the reversible constant speed electric control motor 177. A cam roller 184 engaged by the cam 181, and mounted to move with the brush 179, drives the brush in one direction across the winding 180 of the potentiometer 178. The winding 180 is connected in circuit with the main drive motor 21 and controls the speed of this motor, thereby regulating the frequency of vibrations imparted to the table 52. The cam roller 184 is constantly urged against the cam 181 by means of a suspended weight 185, which also serves to move the brush in a direction opposite to said one direction under the control of the cam 181, the weight being attached to one end of a flexible member 186 guided over pulleys 187 and attached at its opposite end to the mounting which supports the cam roller 184 and the brush 179.

The operation of the reversible motor 177 is under control of a pair of motor reversing microswitches 190 and 191 and an intermediate limit or motor cut-out switch 192, which are, in turn, controlled by three roller-type actuators 193, 194 and 195, respectively. Fixed to the shaft which carries the potentiometer controlling cam 181 are two adjustable switch-controlling arms 198 and 199 having arcuate shaped outer ends adapted to alternately engage the switch actuators 193 and 194 of the switches 190 and 191, respectively, to reverse the supply of current to the control motor 177, thus to reverse the direction of rotation of the main control lever cam 169 and the potentiometer cam 181. In their positions shown in Fig. 1, the arms 198 and 199 have been rotated clockwise and the arm 198 has just actuated the microswitch 191 and, consequently, the rotation of the two arms and the associated potentiometer controlling cam 181 will be initiated in a counterclockwise direction to cause the arm 199 to actuate the microswitch 190. Thus, the drive to the cams 169 and 181, which control the range of amplitude and frequency of vibrations of the table 52 will again be reversed. The switch 192, which is included in the circuit to the motor 177 and arranged in the path of either of the arms 198 and 199, serves, in case the microswitches 190 and 191 fail at any time, to completely break the supply of current to the motor. In addition, vibrating in either a horizontal or a vertical path, as above described, the table 52 may also be driven through circular paths of varying diameters. To provide for this latter type of movement, the eccentric shaft portions 40 and 41 are offset 90° from one another, as hereinbefore described. Thus, the manually operable rod 106 may be slid to a position intermediate its extreme left and right hand positions, as clearly shown in Figs. 13 and 14, and in such intermediate position, the right and left hand eccentric shaft portions 41 and 40 will both be clutched to their associated eccentric bushings 43 and 42, respectively, as indicated in dotted lines in Fig. 14. This referred-to intermediate position of the rod 106 will slide the clutch sleeve 100 to the fragmentary broken outline position indicated at 200 in Fig. 14, in which position each of the eccentric shaft portions 40 and 41 are clutched by means of the teeth 115 carried on opposite ends of the clutch sleeve 100 meshing with the teeth 116 on the "Oldham" clutch bushings 97, as shown in broken outline, and in this position the teeth 121 on the bushings 97 are disengaged from the teeth 122 on the flanged sleeves 101 and 102, which sleeves move longitudinally with the clutch sleeve 100.

Thus, in the operation of the apparatus, both of the eccentric bushings 42 and 43 will be driven and since the eccentric shaft portions 40 and 41 are offset 90°, the table will be vibrated through a circular path. Suitable locking means (not shown) may be provided for retaining the manually shiftable rod 106 in each of its three positions.

Fixed to and reciprocating with the yoke bearing block 141 is a pointer 202, which is mounted for movement outside a forward frame member 203 of the apparatus (Figs. 2, 3 and 7), the pointer cooperating with a scale plate 204 attached to the frame member. In the operation of the apparatus, the pointer 202 and the scale plate will indicate the amplitude of vibration of the table 52 at very low frequencies. At these low frequencies, it will be readily apparent there is practically no overthrow due to elasticity. At higher frequencies, the scale and pointer will provide, by its movement, an indication of the degree of compensation being effected due to elasticity by moving to the left to indicate the reduction in eccentricity which is necessary to compensate for the increased overthrow at higher frequencies.

One operative arrangement of the above-described apparatus will now be described as illustrative of one mode of operation of the apparatus. If it be assumed that it is desired to impart vertical vibrations to a piece of apparatus mounted on the table 52 and suitably fixed thereto, and if it be assumed that the apparatus to be tested is to be subjected to vibrations over fixed amplitudes at a gradually decreasing rate from, for example, 60 cycles to nearly 0 cycles per second and, at the same time, it is desirable to compensate for the elasticity of the various operative connections between the shaft 23 and the table 52, the apparatus is set up as shown in Figs. 1 to 9, inclusive, and Figs. 12, 13 and 14. As hereinbefore described, and as shown in Figs. 4 and 13, the manually operable rod 106 has been moved to such a position that the right hand eccentric portion 41 of the shaft 23 has been clutched to its associated eccentric bushing 43 and thus vertical vibrations of the table will occur upon rotation of the shaft, the left hand eccentric portion 40 of the shaft being unclutched from its associated eccentric bushing 42 and set to zero eccentricity with respect to the axis of the shaft and locked against rotation with respect thereto in a manner previously described. In addition to this shifting of the rod 106, the cam 169, which has a predetermined peripheral contour for shifting the main control lever 157, is mounted upon the shaft 170. It is to be understood that the position of the pin 164 in the slot 165 of the lever 166 determines the length of throw of the main control lever 157 and thus the throw or axial movement of the amplitude control nut 126 effected by the movement of the lever 157. The closer the pin 164 is set to the cam roller 168, the greater will be the throw and, hence, the greater the degree of compensation effected. Obviously, as the frequency changes, the eccentricity must also be changed since at higher frequencies the overthrow is greater, while at lower frequencies it is less due to the elasticity in the operative connections between the shaft 23 and the table 52. Thus, on increasing speed, the eccentric bushing will be rotated closer to the zero position, and vice versa. Rotary adjustment of the eccentric bearing 161 changes the points of reversal of the nut 126 without changing the shift distance controlled by the position of the pin 164 in the slot 165 of the lever 166. In addition to the above adjustments and set-up, the potentiometer controlling cam 181 is secured to the slow speed shaft of the speed reducer 174 in proper relation to the predeterminedly adjusted switch controlling arms 198 and 199. The arms 198 and 199, in cooperation with the switches 190 and 191, serve to control the reversal of the supply of current to the control motor 177 and thereby the direction of rotation of the main control lever cam 169 and the potentiometer cam 181.

With the apparatus set up as above described to impart vertical vibrations to the table 52, the motors 21 and 177 are started. As the motor 21 drives the shaft 23, the motor 177 will be driving the cams 169 and 181 back and forth through a rotary path so as to cause change in amplitude and frequency of vibrations, respectively, of the table with the compensating mechanism functioning in the manner previously described to compensate for the elasticity of the operative connections between the shaft 23 and the table 52 with a high degree of accuracy.

When it is desired to use the above-described apparatus to test articles at a constant rate of acceleration over a selected range of frequency and to maintain the selected rate of acceleration constant, changes are made in its set-up as follows: The extension lever 159 is detached from the main control lever 157 (Figs. 10 and 11) and replaced by a split extension lever 205, which is rotatably secured to the eccentric portion 171 of the shaft 170 in a manner similar to that of the extension lever 159 to the pin 164. Also, with these changes in the set-up of the apparatus, the lever 166 is not necessary and is removed. Thus, in the rotation of the shaft 170 and the resultant crank action of the eccentric shaft portion 171, the combined levers 157 and 205 will have imparted thereto oscillatory and reciprocatory motions. The eccentricity of the eccentric bushings 42 and 43 relative to the axis of the shaft 23 will, therefore, be varied over a selected range to thereby control the amplitude of vibrations of the table 52. The speed of the main drive shaft 23 is under control of the potentiometer cam 181, which is so designed that the speed of the motor 21 will vary in such a way as to bear a definite mathematical relation to the amplitude of vibrations of the table controlled by the position of the eccentric portion 171 of the shaft 170 and so result in a constant rate of acceleration of the table.

What is claimed is:

1. In a controller for a vibrating apparatus, a vibratory means, a main drive shaft having an eccentric portion, an eccentric bushing mounted on said eccentric shaft portion, an operative connection between said bushing and vibratory means, a screw connection between the shaft and bushing for varying the angular position of the bushing relative to the eccentric shaft portion, means for controlling the speed of the shaft, and means interconnected with said last-mentioned means for setting said screw connection in accordance with the speed of the shaft, said last-mentioned means including a link and lever mechanism connectible to adjust said screw connection to compensate for changes in amplitudes of vibration of said vibratory means due to elasticity of said operative connection.

2. In a controller for a vibrating apparatus, a vibratory means, a main drive shaft having an eccentric portion, an eccentric bushing mounted on said eccentric shaft portion, an operative connection between said bushing and vibratory means, a screw connection between the shaft and bushing for varying the angular position of the bushing relative to the eccentric shaft portion, means for controlling the speed of the shaft, and means associated with said last-mentioned means effective to adjust said screw connection in accordance with the speed of the shaft to compensate for changes in amplitude of vibration of said vibratory means due to elasticity of said operative connection and thereby maintain the amplitude of the vibratory means constant.

3. In a vibrating apparatus, a vibratory means to be vibrated, means for vibrating said vibratory means in a predetermined path including means for varying the frequency and amplitudes of vibrations imparted by the vibrating means to the vibratory means, an operative connection between said vibrating means and said vibratory means, means interconnected with the frequency varying means for varying the amplitudes of vibrations of the vibratory means in accordance with the frequency thereof, and means associated with said last-mentioned means effective to adjust said means for varying the amplitudes of the vibrations in accordance with the frequency thereof to compensate for changes in amplitude of vibration of said vibratory means due to elasticity of said operative connection and thereby maintain the amplitude of the vibratory means constant.

4. In a vibrating apparatus, a main drive shaft, means for driving said shaft, means for varying the speed of said driving means in accordance with a predetermined pattern, vibratory means, a pair of eccentric surfaces on said shaft, eccentric bushings on said surfaces, means interconnecting said bushings and vibratory means, means on said shaft intermediate said surfaces for varying the angular position of said bushings relative to the eccentric surfaces of said shaft to vary the amplitudes of vibrations of said vibratory means, and means interconnected with said last-mentioned means on said shaft for setting said means on the shaft in accordance with the speed of said shaft, said interconnected means being connectible to adjust said means on the shaft to compensate for changes in amplitude of said vibratory means due to elasticity of said means interconnecting said shaft and vibratory means.

5. In a vibrating apparatus, a table, a plurality of levers for supporting said table, compound eccentrics for actuating said levers to impart amplitudes of vibrations to said table, means for varying the effective eccentricities of said eccentrics, a drive shaft common to said eccentrics, means interconnected with the means for varying the effective eccentricity of the eccentrics for varying the speed of the shaft, and means including an element coaxial with the shaft and optionally settable longitudinally of said shaft to render one of said compound eccentrics ineffective.

6. In a vibrating apparatus, a main drive shaft, means for driving said shaft, means for varying the speed of said driving means, vibratory means, variable operative connections between said shaft and vibratory means, means for varying said connections in accordance with a predetermined pattern, and means associated with said speed varying means effective to adjust said variable operative connections in accordance with the speed to compensate for changes in amplitude of vibration of said vibratory means due to elasticity of said variable operative connections and thereby maintain the amplitude of the vibratory means constant.

7. In a vibrating apparatus, a vibratory means for supporting articles to be vibrated, a rotary drive shaft, means operatively associated with and driven from said shaft for vibrating said vibratory means in either of several selected paths, means for varying the frequency and amplitudes of vibrations imparted to the vibratory means, means for maintaining the peak acceleration of the vibratory means constant as the amplitudes and frequencies thereof are varied, an element surrounded by said shaft and coaxial therewith and settable longitudinally of said shaft to select the path of vibration of said vibrating means, and an operative connection between said element and said means for vibrating said vibratory means.

8. In a vibrating apparatus, vibratory means for carrying articles to be vibrated, a main drive shaft, a pair of compound eccentric means driven by said shaft comprising eccentric portions on said shaft and eccentric bushings surrounding said eccentric portions of the shaft for vibrating the vibratory means in several paths, control means for varying the relative rotative position of said eccentric portions and their associated bushings, shiftable means surrounding said shaft for selectively connecting an eccentric bushing to said control means, an actuator for said shiftable means mounted in an axial aperture of the shaft and settable longitudinally thereof, and a connection from said actuator to said shiftable means operable through a radial opening in the shaft.

9. In a vibrating apparatus, a vibratory means to be vibrated, variable means for vibrating said vibratory means, a variable speed motor for driving said vibrating means, an operative connection between said vibrating means and said vibratory means, and means for varying the action of said vibrating means to compensate for inherent elasticity between said vibrating means and said vibratory means including a driven cam, a cam lever oscillatable about a fixed pivot by said cam, an adjusting lever for varying the vibratory action of said vibrating means on said vibratory means, and means for operatively connecting said adjusting lever to said cam lever at a selected position on the cam lever to vary the action of said adjusting lever on said vibrating means in accordance with the speed of the motor.

10. In a vibrating apparatus, a vibratory means to be vibrated, variable means for vibrating said vibratory means, a variable speed motor for driving said vibrating means, an operative connection between said vibrating means and said vibratory means, and means for varying the action of said vibrating means to compensate for inherent elasticity between said vibrating means and said vibratory means including a driven cam, a cam lever driven by said cam, an adjusting lever for varying the vibratory action of said vibrating means on said vibratory means, means for operatively connecting said adjusting lever to said vibrating means comprising reciprocatory elements movable in spaced parallel paths, and a universal joint connecting said elements.

11. In a vibrating apparatus, a vibratory means to be vibrated, variable means for vibrating said vibratory means, a variable speed motor for driving said vibrating means, an operative connection between said vibrating means and said vibratory means, and means for varying the action of said vibrating means to compensate for inherent elasticity between said vibrating means and said vibratory means including a driven cam, a cam lever driven by said cam, an adjusting lever for varying the vibratory action of said vibrating means, means for operatively connecting said adjusting lever to said vibrating means comprising reciprocatory elements movable in spaced parallel paths, a universal joint connecting said elements, and means for operatively connecting said adjusting lever to said cam lever at a selected position on the cam lever to vary the action of said adjusting lever on said vibrating means in accordance with the speed of the motor.

12. In a vibrating apparatus, a vibratory means to be vibrated, variable means for vibrating said vibratory means, a variable speed motor for driving said vibrating means, means for operatively connecting said vibrating means to said vibratory means, and means for varying the action of said vibrating means to compensate for inherent elasticity between said vibrating means and said vibratory means including a driven cam, a cam lever driven by said cam, an adjusting lever for varying the vibratory action of said vibrating means on said vibratory means, means for operatively connecting said adjusting lever to said cam lever at a selected position on the cam lever to vary the action of said adjusting lever on said vibrating means in accordance with the speed of the motor, and means associated with said means for operatively connecting said adjusting lever to said cam lever for varying the position of said adjusting lever without changing said selected position of connection of said adjusting lever with said cam lever.

13. In a vibrating apparatus, a vibratory table, a main drive shaft, a variable speed motor for driving said shaft, variable eccentric assemblies on said shaft for reciprocating the table, and means for controlling the eccentricity of said assemblies to compensate for inherent elasticity in the connections between the eccentrics and table including a driven cam, a cam lever driven by said cam, an adjusting lever for said assemblies, and a link extending from said adjusting lever and connectible to said cam lever at a selected position on the cam lever for adjusting the eccentricity of the assemblies in accordance with the speed of the motor.

14. In a vibrating apparatus, a vibratory means to be vibrated, variable means for vibrating said vibratory means, a variable speed motor for driving said vibrating means, an arm connected to said vibrating means, a multiple lever and link mechanism between said arm and said vibratory means, and means for varying the action of said vibrating means to compensate for inherent elasticity between said vibrating means and said vibratory means including a driven cam, a cam lever driven by said cam, an adjusting lever for varying the vibratory action of said vibrating means on said vibratory means, and means for operatively connecting said adjusting lever to said cam lever at a selected position on the cam lever to vary the action of said adjusting lever on said vibrating means in accordance with the speed of the motor.

15. In a vibrating apparatus, a vibratory means to be vibrated, a main driving shaft having an eccentric portion, an eccentric bushing mounted on said eccentric shaft portion, a bearing ring surrounding said eccentric bushing, and an operative connection between said bushing and vibratory means including an arm extending from said bearing ring, a pair of levers each connected at one end to said arm and extending in opposite directions, and a pair of links each connected at one end to each of the opposite ends of said levers, said links being connected at their opposite ends to said vibratory means.

EINER W. LARSEN.

REFERENCES CITED

The following references are of record in the file of this patent:

UNITED STATES PATENTS

| Number | Name | Date |
|---|---|---|
| 2,348,189 | Buchanan et al. | May 9, 1944 |
| 2,399,503 | Ott | Apr. 30, 1946 |
| 1,901,122 | Robins | Mar. 14, 1933 |
| 2,232,124 | Markley | Feb. 18, 1941 |